A. I. GONSALVES.
DEVICE FOR PREPARING INFUSIONS.
APPLICATION FILED AUG. 11, 1916.

1,238,759.

Patented Sept. 4, 1917.

WITNESSES

INVENTOR
A. I. Gonsalves
BY
ATTORNEYS

UNITED STATES PATENT OFFICE.

ANTONIO IZIDRO GONSALVES, OF FUNCHAL, MADEIRA ISLANDS.

DEVICE FOR PREPARING INFUSIONS.

1,238,759.      Specification of Letters Patent.      Patented Sept. 4, 1917.

Application filed August 11, 1916. Serial No. 114,363.

*To all whom it may concern:*

Be it known that I, ANTONIO IZIDRO GONSALVES, a citizen of the Republic of Brazil, and a resident of Funchal, Madeira Islands, have invented a new and Improved Device for Preparing Infusions, of which the following is a full, clear, and exact description.

My invention relates to a device for preparing infusions. The object thereof is to provide a simple and inexpensive device particularly adaptable for preparing an infusion of coffee.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in both views.

Figure 1:
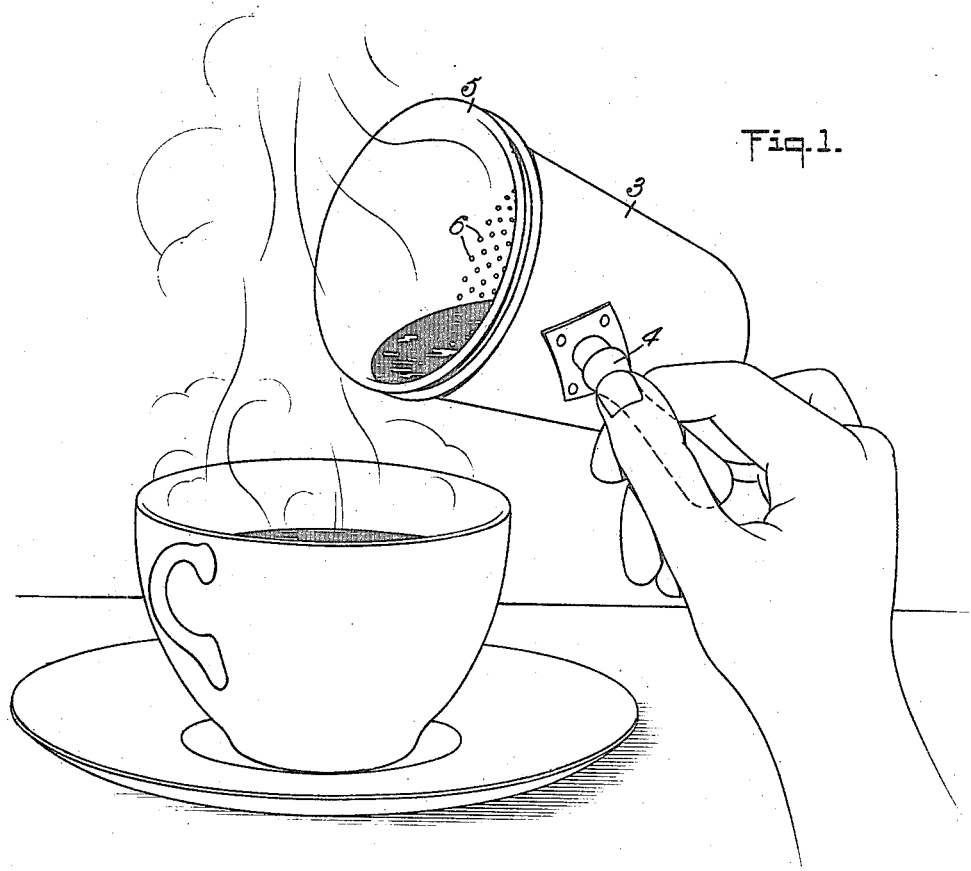
Figure 2:
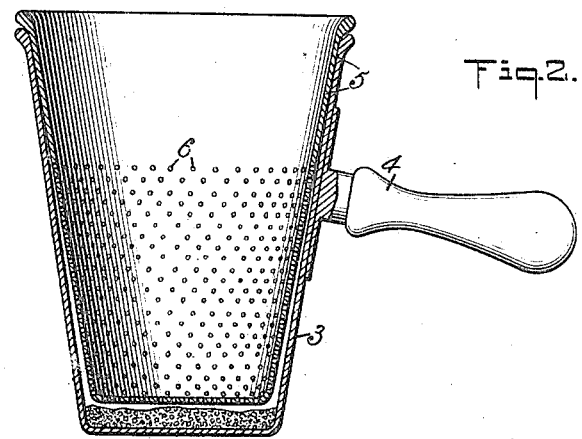

Figure 1 is a perspective view of the device illustrating the use of the device; and Fig. 2 is a vertical section through the device.

Referring to the drawings, 3 is the outer vessel, preferably in the shape of a conical tumbler, wider at its mouth, and the size of which may vary according to the quantity of infusion to be prepared. Ordinarily the tumbler will be sufficiently large to form a normal cup of coffee infusion. It is provided with a handle 4 to facilitate the handling of the tumbler. A tumbler 5 of similar shape is made to fit into the tumbler 3. The taper of the inner tumbler is greater than the taper of the outer tumbler, so that a tight fit is formed between the two tumblers at the mouth, but there is an increasing play toward the bottom of the tumblers. The inner tumbler has a large number of small perforations 6 in the lower half and in the bottom thereof to allow the infusion to pass from the outer to the inner tumbler.

The use of the device is as follows: Coffee is placed into the outer tumbler 3 and boiling water is poured thereon to form the infusion. The inner tumbler is then placed into the outer tumbler and the infused liquid will pass through the opening 6 into the inner tumbler, but the residue of the infusion will remain in the outer tumbler, as clearly shown in Fig. 2. The close fit between the two tumblers at the mouth prevents any liquid from flowing between the two tumblers when the infusion is poured from the inner tumbler, as shown in Fig. 1; and it also prevents the residue in the outer tumbler from passing between the tumblers and thus affecting the infusion poured into the cup.

It will be noted that in my device the inner tumbler performs the function of a strainer which is removable from the tumbler, and, in consequence, the device can be easily cleaned and maintained sanitary. The two tumblers can be made of any suitable material, but preferably they are made of aluminum. The inner tumbler, if desired, may have the strainer part thereof off set to provide a larger clearance between the two tumblers; also if desired, the strainer part of the inner tumbler may be separate and secured to the part of the inner cup which forms a tight joint with the outer tumbler.

I claim:

The herein described infusion device, comprising an outer spoutless conical receptacle having a flat bottom adapted to receive the matter to be infused, and an inner conical receptacle unattached to the outer receptacle and having a flat bottom and perforations in its sides and bottom, the inner receptacle being of slightly less height and of a greater taper than the outer receptacle, so that when it is placed in the outer receptacle it will extend to within a short distance of the bottom of said outer receptacle and will be held therein by friction at the upper ends of the receptacles and form a tight joint at said upper end with a gradually decreasing space between them, whereby the infused liquid can be poured from the inner receptacle and the residue will be retained in the outer receptacle.

ANTONIO IZIDRO GONSALVES.

Copies of this patent may be obtained for five cents each, by addressing the "Commissioner of Patents, Washington, D. C."